United States Patent Office 3,469,649
Patented Sept. 30, 1969

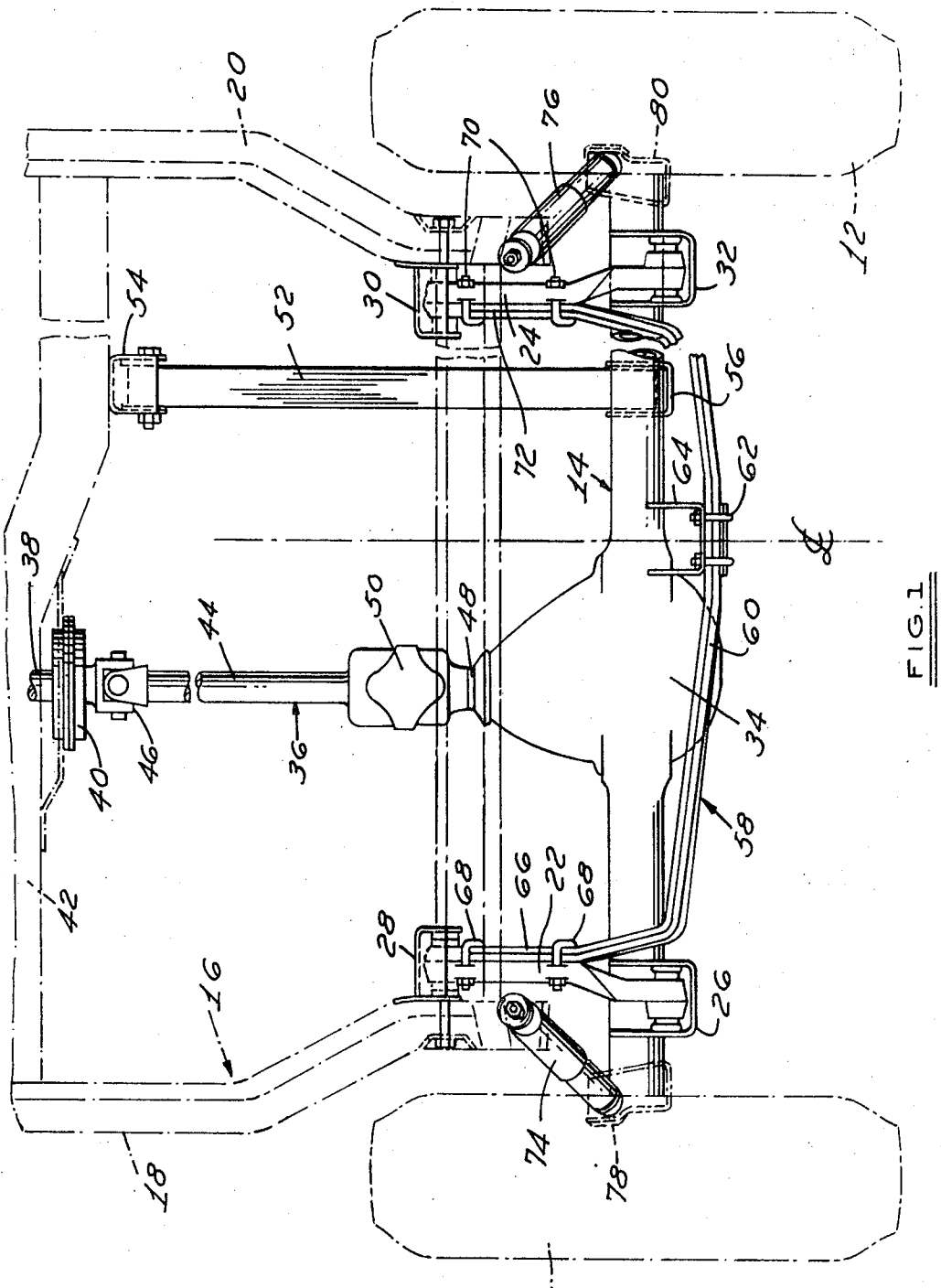

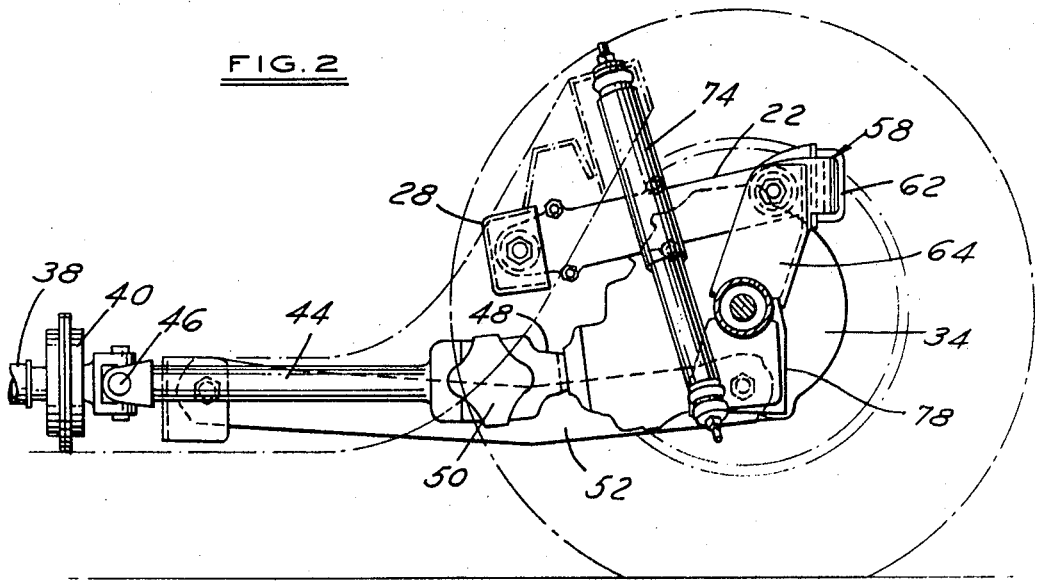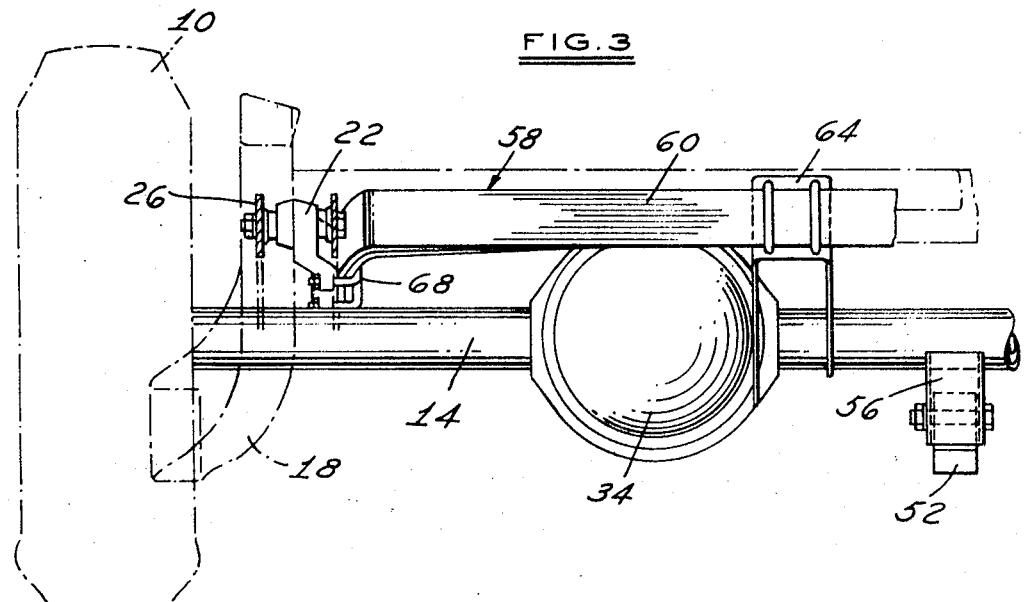

3,469,649
REAR SUSPENSION SYSTEM FOR A MOTOR VEHICLE
Kenneth L. Hoyt, Dearborn, and Achille C. Sampietro, Bloomfield Hills, Mich., assignors to Ford Motor Company, Dearborn, Mich., a corporation of Delaware
Filed July 7, 1967, Ser. No. 651,738
Int. Cl. B60g 21/04, 11/32
U.S. Cl. 180—71                                15 Claims

ABSTRACT OF THE DISCLOSURE

A rear suspension system for a motor vehicle having a solid rear axle housing positioned by a pair of conventional upper suspension arms and a pair of lower suspension links. One of the lower links is the vehicle drive shaft which performs the dual function of transmitting torque and positioning the axle housing. A laterally extending leaf spring interconnects the two upper suspension arms and is loaded in torsion to support the chassis on the axle housing.

BACKGROUND OF THE INVENTION

In any motor vehicle it is the object of the suspension system to position the wheels and to absorb and resist the forces encountered. In a suspension system for a rigid axle housing interconnecting driving wheels, it is the particular object of the suspension system to define a vertical jounce and rebound path for the wheels, to resist lateral movement of the axle housing with respect to the frame and finally, to resist rotation of the axle housing during acceleration and braking. Several ways are suggested in the prior art for performing these several functions.

In a Hotchkiss rear suspension, the axle housing is clamped to the middle of longitudinally extending leaf springs and the leaf springs position the axle housing and prevent its rotation. In a coil spring suspension, it is not uncommon to provide a plurality of suspension links or arms that are pivotally connected to the axle housing and the frame of the vehicle. In combination, these arms or links determine the longitudinally position of the axle housing and absorb torque reaction occurring during acceleration or braking.

Lateral deflection of the axle housing in a linkage type suspension is prevented by a panhard rod or by angling of the suspension arms. Both of these solutions have certain inherent disadvantages. In one, the panhard rod adds cost and weight to the suspension system. In the other, angling of the suspension arms to prevent lateral deflection may produce certain undesirable suspension geometry characteristics.

The present invention provides a unique linkage type suspension system that solves several disadvantages present in prior art suspensions. In this invention, the drive shaft performs its usual function of transmitting torque to the differential and an additional function of positioning the axle in the manner of a suspension member. The weight of the chassis is supported on the axle by a laterally extending leaf spring that is loaded in torsion. The leaf spring interconnects the suspension arms and the axle housing and serves to position the housing laterally of the vehicle chassis as well as support the load.

BRIEF SUMMARY OF THE INVENTION

In accordance with the preferred embodiment of the present invention, a rear suspension system for a motor vehicle having a rigid axle housing that journals left and right driving wheels is provided. A pair of longitudinally extending upper suspension arms or links are pivotally connected to the chassis frame and to the axle housing. The housing contains differential gearing in which a pinion shaft extends forwardly at a slightly downward angle. The driveline connecting the engine with the differential pinion shaft includes a nonextensible articulated shaft section having a first universal joint connected to the forward section of the driveline and a second universal joint connected to the end of the pinion shaft. A thrust bearing journals the driveline adjacent to the forward or first universal joint and permits the nonextensible shaft section to function as a suspension link. The differential housing is situated to one side of the centerline of the vehicle so that the driveline is also laterally offset. To balance the forces, a conventional lower suspension arm accompanies the dual purpose drive shaft.

A leaf spring extends between the upper suspension arms and is connected to the axle housing. The leaf spring is loaded in torsion so as to resiliently support the load of the chassis. This suspension spring also performs the function of positioning the axle housing laterally with respect to the frame.

This suspension construction has the advantage of superior operating characteristics while enjoying manufacturing economies as a result of its simplicity. The simplicity of the design results from the fact that the drive shaft performs a dual function of transmitting torque and performing as a suspension link. In addition, the main suspension spring performs the dual function of supporting the chassis load and of positioning the axle housing laterally with respect to the frame.

BRIEF DESCRIPTION OF THE DRAWINGS

The many objects and advantages of the present invention will become amply apparent upon consideration of the following detailed discussion and accompanying drawings, in which:

FIGURE 1 is a top plan view of the rear suspension system for a motor vehicle incorporating the presently preferred embodiment of this invention;

FIGURE 2 is a side elevational view of the suspension of FIGURE 1; and

FIGURE 3 is a rear elevational view of the same suspension.

DETAILED DESCRIPTION OF THE INVENTION

Referring now to the drawings for a more complete understanding of this invention, FIGURE 1 illustrates a rear suspension system for a motor vehicle that incorporates the presently preferred embodiment of this invention. Left and right driving wheels 10 and 12 are journalled at the outer ends of the laterally extending rigid axle housing 14. A vehicle frame 16 has left and right side rails 18 and 20 that are situated adjacent to the wheels 10 and 12. Novel suspension means is provided in accordance with this invention for connecting the axle housing 14 to the frame assembly 16.

A pair of longitudinally extending upper suspension arms or links 22 and 24 connect the frame 16 with the axle housing 14. The left arm 22 is pivotally connected to a channel-shaped bracket 26 that is welded to the axle housing 14 adjacent the left wheel 10. A bracket 28 welded to the left side rail 18 forms a support to which the forward end of the left suspension arm 22 is pivotally connected. In a similar fashion, the forward end of the right upper suspension arm 24 is pivotally connected to a frame bracket 30. A channel-shaped bracket 32 is welded to the axle housing 14 adjacent to the wheel 10 and extends upwardly therefrom. The rear end of the arm 24 is pivotally connected to the bracket 32.

The axle housing 14 includes a differential gear housing 34. An articulated driveline 36 has its rear end connected to the gearing within the housing 34 and transmits power or driving torque to it from a forwardly mounted power plant. The driveline 36 includes a forward shaft section 38 having one end constructed to be connected to the power plant. A bearing 40 supports the shaft section 38 near its rearward end. The bearing is mounted on a frame cross member 42 that interconnects the side rails 18 and 20. A shaft member 44 has its forward end connected to the shaft section 38 by means of a universal joint 46. The rear end of the shaft 44 is joined to the pinion shaft 48 extending from the differential housing 34 by means of a universal joint 50.

The bearing 40 is constructed to absorb thrust loads and to maintain a set longitudinal position of the shaft member 38 with respect to the vehicle frame 16. The portion of the driveline assembly 36 comprising the shaft section 44 and the universal joints 46 and 50 is nonextensible and, therefore, this portion of the driveline assembly will position the axle housing 14 longitudinally of the vehicle as well as transmit driving torque.

It will be noted in the drawings that the axle housing 14 and the driveline 36 are positioned to the left of the centerline of the chassis. With this arrangement, the usual hump or tunnel in the floor pan is located between the center and left-hand rear seat passenger whereby the center passenger is provided with improved accommodations. In order to balance the suspension forces occurring because the driveline 36 is positioned to one side of the centerline, a lower suspension arm 52 is provided. The suspension arm 52 has its forward end pivotally connected to a bracket 54 that is welded to the cross member 42. The rear end of the arm 52 is pivotally joined to a bracket 56 that is welded to the axle housing 14.

In accordance with the present invention, means are provided for resiliently supporting the chassis load upon the axle 14 and for positioning the axle 14 laterally with respect to the chassis. In accordance with this invention, such means includes a leaf spring assembly 58 having a laterally extending central portion 60 that is clamped by the structure 62 to a bracket 64 welded to the axle housing 14 near the centerline of the vehicle. The outer ends of the leaf spring assembly 60 are angled forwardly parallel to the suspension arms 22 and 24. The angled left end 66 of the spring 58 is secured to the left upper arm 22 by means of a pair of U-bolts 68. In a similar fashion, U-bolts 70 secure the angled right-hand end 72 of the spring 58 to the right upper suspension arm 24.

The present invention also provides means for damping relative movement between the axle housing and the chassis. For this purpose, left and right hydraulic shock absorbers 74 and 76 are provided. The left shock 74 is bolted to a bracket 76 welded to the axle housing. The upper end of the shock absorber 74 is secured to the left frame side rail 18. The right shock absorber 76 is interposed between the right frame rail 20 and the frame bracket 80.

OPERATION

In accordance with the present invention, the axle housing 14 is positioned longitudinally with respect to the frame 16 by a linkage system which comprises the upper suspension arms 22, 24 and the lower suspension links 44, 52. The upper arms 22, 24 and the lower links 44, 52, in addition to positioning the axle longitudinally, combine to resist rotation of the axle housing 14 during acceleration and braking. The link 44 performs its suspension function as well as its more obvious one of serving as an element in the driveline 36.

The main suspension spring 58 performs the dual function of supporting the vehicle load and of positioning the axle housing 14 laterally with respect to the vehicle centerline. The central transverse portion 60 of the spring assembly 58 is loaded in torsion to support the load. The angled end portions 66 and 72 form load lever arms which impart a torsional loading into the spring 58 when the suspension arms 22 and 24 move in jounce and rebound. The angled end portions 66 and 72, being formed of leaf spring material, are laterally flexible and, therefore, permit lateral movement of the axle housing 14 with respect to the frame 16 in accordance with the jounce and rebound movement of the wheels 10 and 12. These spring portions 66 and 72, however, provide a biasing force which tends to keep the axle housing 14 centrally disposed with respect to the centerline of the chassis.

The chassis attachment points for the several elements of the suspension system are all situated forwardly of the axle housing 14 and, therefore, the frame assembly 16 need not extend rearwardly of the housing 14. This permits a significant reduction in reinforcing structure for the frame.

The foregoing description constitutes the presently preferred embodiment of this invention. Modifications and alterations may occur to those skilled in the art that will come within the scope and spirit of the invention.

We claim:

1. A motor vehicle suspension system having an axle housing, a pair of wheels journalled at the outer ends of said axle housing, said axle housing having a differential means connected to said wheels, a chassis frame, suspension means connected to said frame and to said axle housing and constructed to position said axle longitudinally with respect to said frame, said suspension means comprising an articulated nonextensible driveline, said driveline having one end constructed to be connected to a vehicle power plant, said driveline having its other end connected to said differential means, support means constructed to support a portion of said driveline on said chassis frame and to prevent longitudinal displacement therebetween, said driveline being laterally offset to one side of the centerline of said frame, said suspension means also including a suspension arm having one end connected to said frame and its other end pivotally connected to said axle housing, said suspension arm being laterally offset to the other side of the centerline of said vehicle, said suspension means also including a pair of suspension links each having one end pivotally connected to said axle housing and its other end pivotally connected to said frame.

2. A motor vehicle suspension according to Claim 1 and including:
a torsionally loaded spring member, said spring member having a transverse central portion secured to said axle housing and end portions secured to said pair of suspension links.

3. A motor vehicle suspension according to claim 2 and including:
said spring member having a generally U-shape with said end portions extending generally to said pair of suspension links, said end portions being laterally flexible, said end portions being substantially rigidly secured to said links.

4. A motor vehicle suspension system according to claim 1 and including:
said suspension arm being offset from the centerline of said frame by an amount approximately equal to the offset of said driveline.

5. A motor vehicle suspension system according to claim 1 and including:
said articulated driveline comprising first and second shaft members, said second shaft member being joined to said first shaft member by a first universal joints, said second shaft member being joined to said differential means by a second universal joint, said second shaft member and said first and second universal joints being nonextensible and constructed to position said axle housing longitudinally with respect to said frame.

6. A motor vehicle suspension system having an axle housing, a pair of wheels journalled at the outer ends of said axle housing, said axle housing having a differential means connected to said wheels, a chassis frame, suspension means connected to said frame and to said axle housing and constructed to position said axle housing longitudinally with respect to said frame, said suspension means comprising an articulated nonextensible driveline, said driveline having one end constructed to be connected to support a portion of said driveline on said chassis frame and to prevent longitudinal displacement therebetween, said driveline being laterally offset to one side of the including a suspension arm having one end connected to said frame and its other end pivotally connected to said axle housing, said suspension arm being laterally offset to the other side of the centerline of said vehicle by an amount approximately equal to the offset of said driveline.

7. A motor vehicle suspension system according to claim 6 and including:
said articulated driveline comprising first and second shaft members, said second shaft member being joined to said first shaft member by a first universal joint, said second shaft member being joined to said differential means by a second universal joint, said second shaft member and said first and second universal joints being nonextensible and constructed to position said axle housing longitudinally with respect to said frame.

8. A motor vehicle suspension system having an axle housing, a pair of wheels journalled at the outer ends of said axle housing, said axle housing having a differential means connected to said wheels, a chassis frame, suspension means connected to said frame and to said axle housing and constructed to position said axle housing longitudinally with respect to said frame, said suspension means comprising an articulated nonextensible driveline, said driveline having one end constructed to be connected to a vehicle power plant, support means constructed to support a portion of said driveline on said chassis frame and to prevent longitudinal displacement therebetween, said driveline being laterally offset to one side of the centerline of said frame, said suspension means also including a suspension arm having one end connected to said frame and its other end pivotally connected to said axle housing, said suspension arm being laterally offset to the other side of the centerline of said vehicle, said articulated driveline comprising a first shaft member, said support means comprising thrust bearing means supporting said first shaft member on said chassis frame, a second shaft member, said second shaft member being joined to said first shaft member by a first universal joint, said second shaft member being joined to said differential means by a second universal joint, said second shaft member and said first and second universal joints being nonextensible and constructed to position said axle housing longitudinally with respect to said frame, said suspension means also including a pair of suspension links each having one end pivotally connected to said axle housing and its other end pivotally connected to said frame.

9. A motor vehicle suspension according to claim 8 and including:
a torsionally loaded spring member, said spring member having a transverse central portion secured to said axle housing and end portions secured to said pair of suspension links.

10. A motor vehicle suspension according to claim 9 and including:
said spring member having a generally U-shape with said end portions extending generally parallel to said pair of suspension links, said end portions being laterally flexible, means substantially rigidly securing said end portions to said links.

11. A motor vehicle suspension system according to claim 8 and including:
said suspension arm being offset from the centerline of said frame by an amount approximately equal to the offset of said driveline.

12. A motor vehicle suspension system having an axle housing, a pair of wheels journalled at the outer ends of said axle housing, said axle housing having a differential means connected to said wheels, a chassis frame, suspension means connected to said frame and to said axle housing and constructed to position said axle housing longitudinally with respect to said frame, said suspension means comprising an articulated nonextensible driveline, said driveline having one end constructed to be connected to a vehicle power plant, said driveline having its other end connected to said differential means, support means constructed to support a portion of said driveline on said chassis frame and to prevent longitudinal displacement therebetween, said support means comprising a thrust bearing means rotatably supporting a portion of said driveline on said frame at a location intermediate the ends of said driveline, said suspension means also including at least one suspension arm having one end connected to said frame and its other end pivotally connected to said axle housing, said suspension means also including a pair of suspension links each having one end pivotally connected to said axle housing and its other end pivotally connected to said frame.

13. A motor vehicle suspension system according to claim 12 and including:
said articulated driveline comprising a first shaft member, said thrust bearing means supporting said shaft member on said chassis frame adjacent its rearward end, a second shaft member, said second shaft member being joined to said first shaft member by a universal joint, said second shaft member being connected to said differential means, said second shaft member and said universal joint being nonextensible and constructed to position said axle housing longitudinally with respect to said frame.

14. A motor vehicle suspension system according to claim 12 and including:
said articulated driveline comprising a first shaft member and a second shaft member, said thrust bearing means supporting said first shaft member on said chassis frame adjacent to its rearward end, said second shaft member being joined to said first shaft member by a first universal joint, said second shaft member being joined to said differential means by a second universal joint, said second shaft member and said first and second universal joints being nonextensible and constructed to position said axle housing longitudinally with respect to said frame.

15. A motor vehicle suspension system according to claim 14 and including:
said suspension means also including a pair of suspension links each having one end pivotally connected to said axle housing and its other end pivotally connected to said frame.

References Cited

UNITED STATES PATENTS 2,382,246 8/1945 McFarland.
3,204,718 9/1965 Lange _____ 180—73

A. HARRY LEVY, Primary Examiner

U.S. Cl. X.R.
267—11; 280—124